United States Patent
Sato et al.

(10) Patent No.: US 12,545,871 B2
(45) Date of Patent: Feb. 10, 2026

(54) CULTURE CONTAINER FOR CULTURING EPITHELIAL CELLS AND USE THEREOF

(71) Applicant: KEIO UNIVERSITY, Tokyo (JP)

(72) Inventors: Toshiro Sato, Tokyo (JP); Nobuo Sasaki, Tokyo (JP)

(73) Assignee: KEIO UNIVERSITY, Tokyo (JP)

( * ) Notice: Subject to any disclaimer, the term of this patent is extended or adjusted under 35 U.S.C. 154(b) by 1089 days.

(21) Appl. No.: 17/612,153

(22) PCT Filed: Mar. 23, 2020

(86) PCT No.: PCT/JP2020/012585
§ 371 (c)(1),
(2) Date: Nov. 17, 2021

(87) PCT Pub. No.: WO2020/235206
PCT Pub. Date: Nov. 26, 2020

(65) Prior Publication Data
US 2022/0220427 A1    Jul. 14, 2022

(30) Foreign Application Priority Data
May 23, 2019    (JP) ................................. 2019-096905

(51) Int. Cl.
| | |
|---|---|
| C12M 3/00 | (2006.01) |
| C12M 1/00 | (2006.01) |
| C12M 1/04 | (2006.01) |
| C12M 1/107 | (2006.01) |
| C12M 1/12 | (2006.01) |
| C12N 5/071 | (2010.01) |

(52) U.S. Cl.
CPC ............ *C12M 21/08* (2013.01); *C12M 23/24* (2013.01); *C12M 23/36* (2013.01); *C12M 23/38* (2013.01); *C12M 25/02* (2013.01); *C12M 29/04* (2013.01); *C12N 5/0679* (2013.01); *C12N 2500/02* (2013.01); *C12N 2501/105* (2013.01); *C12N 2501/11* (2013.01); *C12N 2501/115* (2013.01); *C12N 2501/15* (2013.01); *C12N 2501/155* (2013.01); *C12N 2501/415* (2013.01); *C12N 2502/70* (2013.01)

(58) Field of Classification Search
None
See application file for complete search history.

(56) References Cited

U.S. PATENT DOCUMENTS

| | | | |
|---|---|---|---|
| 2019/0382703 A1 | 12/2019 | Katayama et al. | |
| 2020/0087617 A1 | 3/2020 | Sato et al. | |

FOREIGN PATENT DOCUMENTS

| | | | | |
|---|---|---|---|---|
| CN | 107794223 A | | 3/2018 | |
| CN | 109072179 A | | 12/2018 | |
| JP | 2014506801 A | | 3/2014 | |
| JP | WO 2018 038042 | * | 1/2018 | ............. C12N 15/86 |
| JP | WO 2018 079793 A1 | * | 2/2019 | ............. C12M 1/00 |
| WO | WO 2012 118799 | * | 7/2012 | ............. C12M 21/08 |
| WO | WO 2012/118799 A2 | | 9/2012 | |
| WO | WO 2017/131839 A2 | | 8/2017 | |
| WO | WO 2018/038042 A1 | | 3/2018 | |
| WO | WO 2018/079793 A1 | | 5/2018 | |
| WO | WO 2019/222333 A1 | | 11/2019 | |

OTHER PUBLICATIONS

Baratta, M. "Epithelial Cell Culture: Methods and Protocolas". Springer Publishing, Nature (Year: 2018).*
Martels et al. "The role of gut microbiota in health and disease: in vitro modeling of host microbe interactions at the aerobe-anaerobe interphase of the human gut". Anaerobe, vol. 44 (Year: 2017).*
Rahmani et al., "intestinal organoids: a new paradigm for engineering intetestinal epithelium in vitro" Biomaterials. Feb. 2019.*
European Office Action for EP Application No. 20809811.1 mailed Apr. 9, 2024, 10 pages.
Kilic et al., "A microphysiological model of the bronchial airways reveals the interplay of mechanical and biochemical signals in bronchospasm", *Nature Biomedical Engineering* 3(7):532-544 (2019).
European Search Report for EP Application No. 20809811.1, mailed Apr. 21, 2023, 12 pages.
Jalili-Firoozinezhad et al., "A complex human gut microbiome cultured in an anaerobic intestine-on-a-chip", *Nature Biomedical Engineering* 3(7):520-531 (2019).
Sasaki et al., "Development of a Scalable Coculture System for Gut Anaerobes and Human Colon Epithelium", *Gastroenterology* 159(1):388-390e1-e5 (2020).
International Search Report for International Application No. PCT/JP2020/012585, mailed Jun. 9, 2020, 6 pages.
Maier et al., "Live *Faecalibacterium prausnitzii* induces greater TLR2 and TLR2/6 activation than the dead bacterium in an apical anaerobic co-culture system", *Cellular Microbiology* 20:e12805, https://doi.org/10.1111/cmi.12805 (2018).
Ulluwishewa et al., "Live *Faecalibacterium prausnitzii* in an apical anaerobic model of the intestinal epithelial barrier", *Cellular Microbiology* 17(2):226-240, https://doi: 10.1111/cmi.12360 Epub Oct. 31, 2014.

* cited by examiner

Primary Examiner — Robert M Kelly
Assistant Examiner — John David Moore
(74) Attorney, Agent, or Firm — Lathrop GPM LLP; Brian C. Trinque; John Wizeman

(57) ABSTRACT

A culture container for culturing epithelial cells, includes an upper container, a lid member configured to airtightly fit with an opening portion of the upper container, and a lower container configured to accommodate the upper container and a cell culture medium, in which at least a part of an area of the upper container in contact with the cell culture medium is formed of a membrane that is permeable to at least a part of components of the cell culture medium and impermeable to a cell, and a material of the lid member has an oxygen permeability coefficient of $1.0 \times 10^{-6}$ cm$^3$ cm/(cm$^2$·sec·atm) or less.

11 Claims, 8 Drawing Sheets

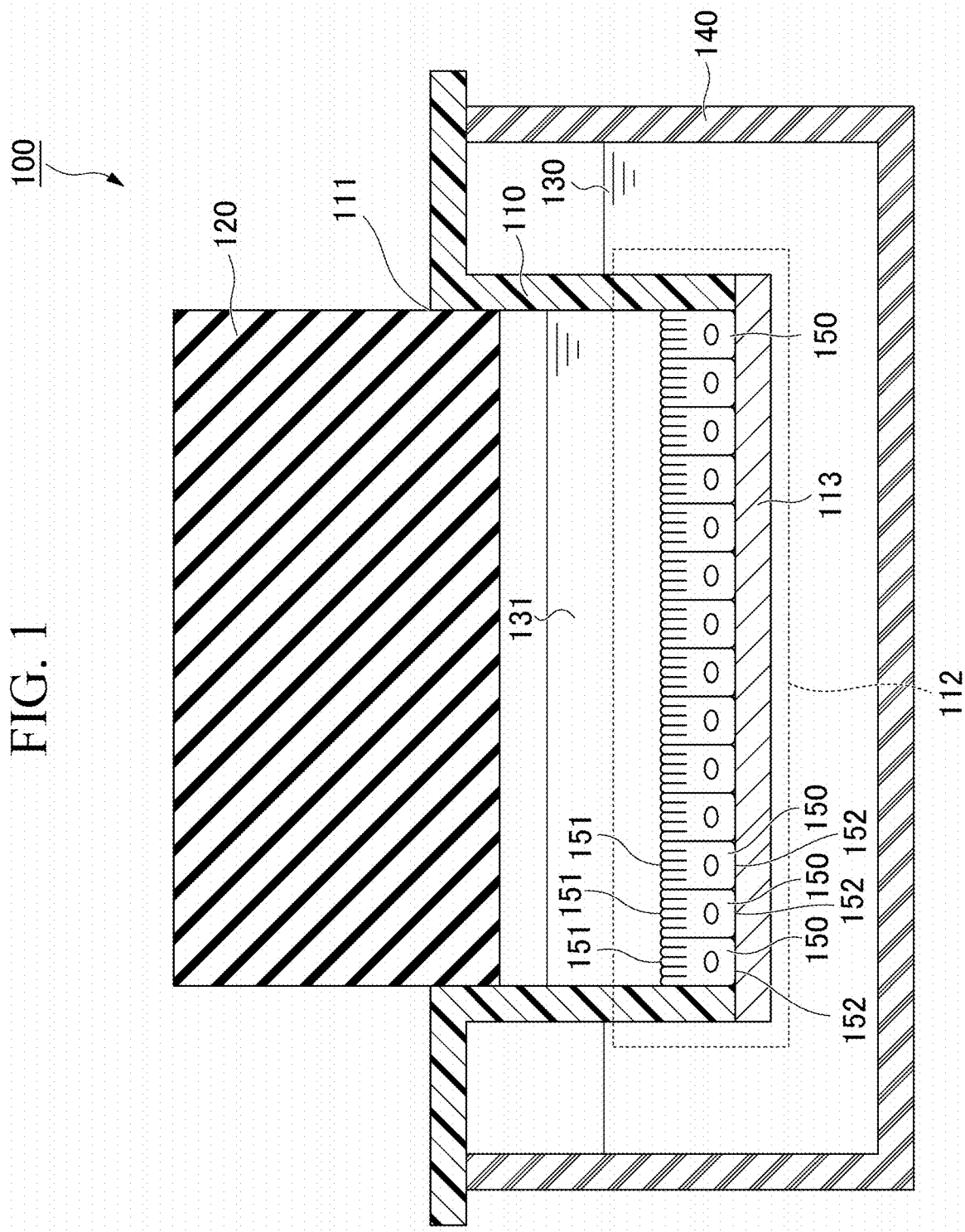

AEROBIC CONDITION

ANAEROBIC CONDITION

ANAEROBIC CONDITION
AND AEROBIC CONDITION

FIG. 6A
AEROBIC CONDITION
FIG. 6B
ANAEROBIC CONDITION AND AEROBIC CONDITION
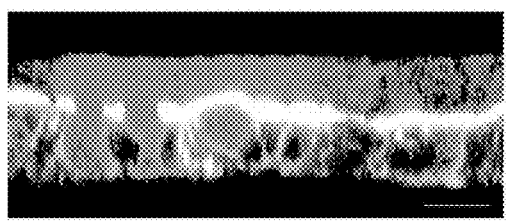
FIG. 7A
AEROBIC CONDITION
FIG. 7B
ANAEROBIC CONDITION AND AEROBIC CONDITION
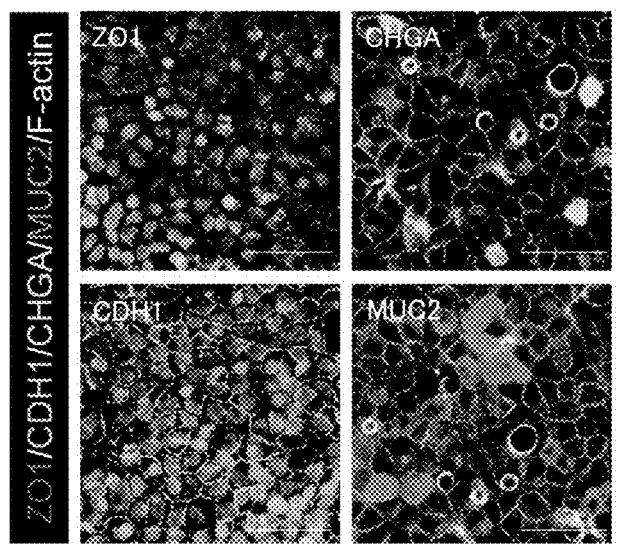
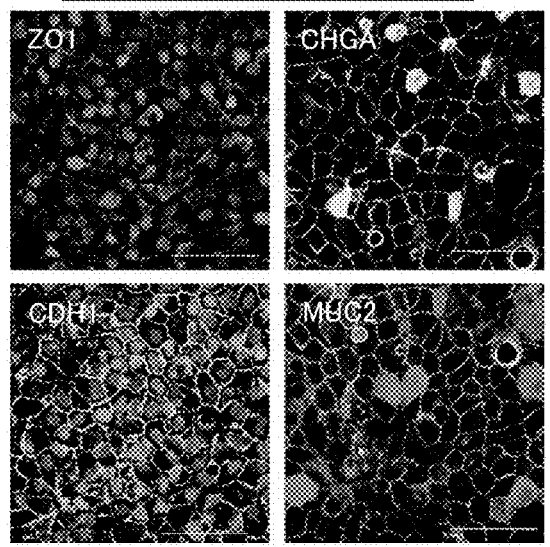

FIG. 8A
FIG. 8B
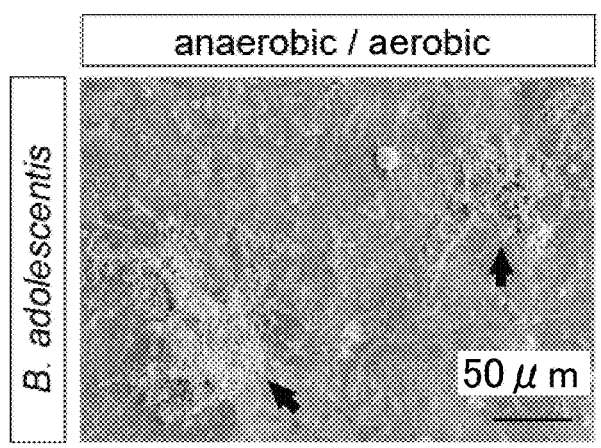
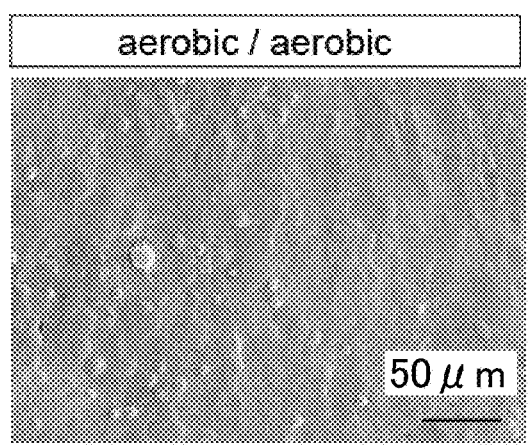

CULTURE CONTAINER FOR CULTURING EPITHELIAL CELLS AND USE THEREOF

TECHNICAL FIELD

The present invention relates to a culture container for culturing epithelial cells and use thereof. More specifically, the present invention relates to a culture container for culturing epithelial cells, a method for culturing epithelial cells, and a co-culture of epithelial cells and anaerobic bacteria. Priority is claimed on Japanese Patent Application No. 2019-096905, filed on May 23, 2019, the content of which is incorporated herein by reference.

BACKGROUND ART

Recent advances in sequencing technology have led to the advancement of molecular genetic phylogenetic classification of intestinal bacteria. In addition, inoculation of sterile mice with intestinal bacteria has made it possible to analyze a function of intestinal bacteria. However, artificial culture of large amount of intestinal bacteria is still not possible and cloning thereof cannot be performed. Such technical constraints are bottlenecks in the medical and biological understanding of intestinal bacteria and in the production of commercial intestinal bacteria.

The inventors have previously developed a technique for culturing a diarrhea virus such as norovirus, by infecting a 2D organoid of intestinal epithelial cells with a diarrhea virus (see, for example, Patent Document 1). As described in Patent Document 1, there are some examples in which it becomes possible to culture intestinal microorganism for the first time by using intestinal epithelial cells as a host factor.

CITATION LIST

Patent Document

[Patent Document 1]
PCT International Publication No. WO 2018/038042

SUMMARY OF INVENTION

Technical Problem

The intestinal tract of animals is kept in an anaerobic state, and most of bacteria that are resident therein are anaerobic bacteria that can grow only under an anaerobic condition. In order to verify a physiological function of these anaerobic bacteria on the intestinal epithelial cells of the host, it is necessary to culture the intestinal epithelial cells under an anaerobic condition. However, epithelial cells such as intestinal epithelial cells cannot be cultured under the anaerobic condition. Therefore, there is a demand for developing a technique for culturing epithelial cells in an environment closer to an internal side of a living body. Therefore, an object of the present invention is to provide a technique for culturing epithelial cells in a plane, easily controlling the oxygen partial pressure on an apical membrane side and a basement membrane side, and culturing the cells in an environment closer to an internal side of a living body.

Solution to Problem

The present invention comprises the following aspects.

[1] A culture container for culturing epithelial cells, including an upper container, a lid member configured to airtightly fit to an opening portion of the upper container, and a lower container configured to accommodate the upper container and a cell culture medium, in which at least a part of an area of the upper container in contact with the cell culture medium is formed of a membrane that is permeable to at least a part of components of the cell culture medium and impermeable to a cell, and a material of the lid member has an oxygen permeability coefficient of $1.0 \times 10^{-6}$ $cm^3$ $cm/(cm^2 \cdot sec \cdot atm)$ or less.

[2] The culture container for culturing epithelial cells according to [1], in which the lid member or the upper container further comprises an oxygen scavenger portion configured to hold an oxygen scavenger.

[3] A method for culturing epithelial cells, including a step (a) of coating a surface of the upper container of the culture container for culturing epithelial cells according to [1] or [2] with an extracellular matrix, a step (b) of accommodating the cell culture medium and the upper container in the lower container, a step (c) of inoculating the extracellular matrix with an epithelial cell, a step (d) of incubating the culture container for culturing epithelial cells under a culture condition to form a layer of a 2D organoid on the extracellular matrix by the epithelial cell, a step (e) of airtightly fitting the lid member to the opening portion of the upper container, and a step (f) of further incubating the culture container for culturing epithelial cells under the culture condition.

[4] The culture method according to [3], in which the epithelial cell is a cell in which a 3D organoid of three-dimensionally cultured epithelial cells is dispersed in a single cell.

[5] The culture method according to [3] or [4], in which the cell culture medium comprises at least one selected from the group consisting of insulin-like growth factor 1 (IGF1), fibroblast growth factor 2 (FGF2), and EGF-like growth factor, and at least one selected from the group consisting of a Wnt agonist, a bone morphogenetic factor (BMP) inhibitor, and a transforming growth factor-β (TGF-β) inhibitor.

[6] The culture method according to [5], in which the EGF-like growth factor contains epiregulin (EREG).

[7] The culture method according to [5] or [6], in which the EGF-like growth factor comprises epidermal growth factor (EGF).

[8] The culture method according to any one of [5] to [7], in which the Wnt agonist comprises a complex of Wnt protein and afamin.

[9] The culture method according to any one of [3] to [8], in which the step (e) is carried out in a low oxygen atmosphere.

[10] The culture method according to any one of [3] to [9], further including: a step of inoculating the upper container, in which the layer of the 2D organoid is formed, with an anaerobic bacterium, after the step (d) and before the step (e).

[11] A co-culture of 2D organoid of epithelial cells and anaerobic bacteria.

[12] The co-culture according to [11], which is obtained by the culture method according to [10].

Effects of the Invention

According to the present invention, it is possible to provide a technique for culturing epithelial cells in a plane, easily controlling the oxygen partial pressure on an apical membrane side and a basement membrane side, and culturing the cells in an environment closer to an internal side of a living body.

BRIEF DESCRIPTION OF DRAWINGS

FIG. 1 is a schematic cross-sectional diagram showing a structure of an example of a culture container for culturing epithelial cells.

FIG. 3A is a result of maintaining both an inside portion of an upper container and an inside portion of a lower container in an oxygen atmosphere. FIG. 3B is a result of maintaining both the inside portion of the upper container and the inside portion of the lower container in an anaerobic condition. FIG. 3C is a result of maintaining the inside portion of the upper container in the anaerobic condition and the inside portion of the lower container in an aerobic condition.

FIG. 4A is a graph showing the measurement result of the dissolved oxygen concentration in a cell culture medium in the upper container, and FIG. 4B is a graph showing the measurement result of the dissolved oxygen concentration in the cell culture medium in the lower container.

FIGS. 6A and 6B are fluorescence micrographs showing results of immunostaining of epithelial cell sections in Experimental Example 3. FIG. 6A is the result of maintaining both the inside portion of the upper container and the inside portion of the lower container in the aerobic condition, and FIG. 6B is the result of maintaining the inside portion of the upper container in the anaerobic condition and the inside portion of the lower container in the aerobic condition.

FIGS. 7A and 7B are fluorescence micrographs showing results of immunostaining of epithelial cell in Experimental Example 4.

FIGS. 8A and 8B are micrographs showing results of co-culturing epithelial cells and anaerobic bacteria in Experimental Example 5. FIG. 8A is the result of maintaining the inside portion of the upper container in the anaerobic condition and the inside portion of the lower container the aerobic condition. FIG. 8B is the result of maintaining both the inside portion of the upper container and the inside portion of the lower container in the aerobic condition.

EMBODIMENTS FOR CARRYING OUT THE INVENTION

[Culture Container for Culturing Epithelial Cells]

Figure 2A:
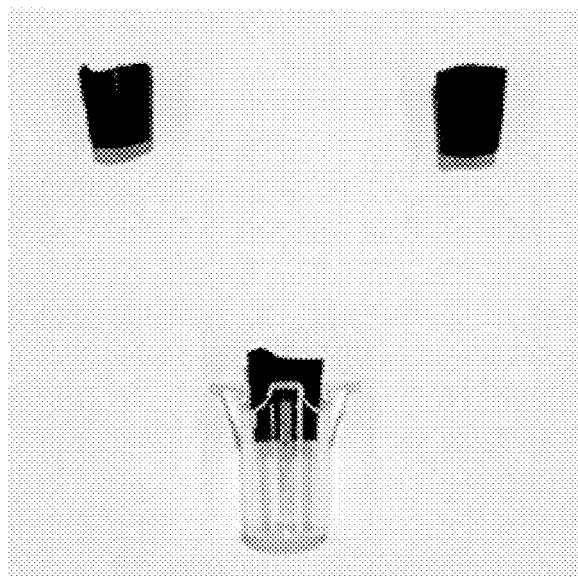
FIGS. 2A to 2C are photographs of a specific example of the culture container for culturing epithelial cells.

According to one embodiment, the present invention provides a culture container for culturing epithelial cells, including an upper container, a lid member configured to airtightly fit to an opening portion of the upper container, and a lower container configured to accommodate the upper container and a cell culture medium, in which at least a part of an area of the upper container in contact with the cell culture medium is formed of a membrane that is permeable to at least a part of components of the cell culture medium and impermeable to a cell, and a material of the lid member has an oxygen permeability coefficient of $1.0 \times 10^{-6}$ cm$^3$ cm/(cm$^2$·sec·atm) or less.

FIG. 1 is a schematic cross-sectional diagram showing a structure of an example of a culture container for culturing epithelial cells of the present embodiment. FIG. 1 shows a state in which epithelial cells are cultured by a culture method described later.

As shown in FIG. 1, a culture container for culturing epithelial cells 100, comprises an upper container 110, a lid member 120 configured to airtightly fit to an opening portion 111 of the upper container 110, and a lower container 140 configured to accommodate the upper container 110 and a cell culture medium 130, in which at least a part of an area 112 of the upper container 110 in contact with the cell culture medium 130 is formed of a membrane 113 that is permeable to at least a part of components of the cell culture medium 130 and impermeable to a cell 150, and a material of the lid member 120 has an oxygen permeability coefficient of $1.0 \times 10^{-6}$ cm$^3$ cm/(cm$^2$·sec·atm) or less. As a medium 131 accommodated in the upper container 110, the same medium as or a different medium from the cell culture medium 130 accommodated in the lower container 140 can be used. A material of the membrane 113 is not particularly limited, and examples thereof include polyester.

Figure 2B:
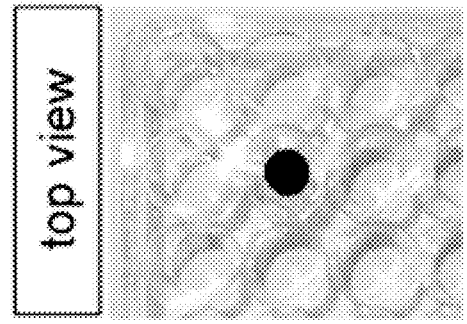
Figure 2C:
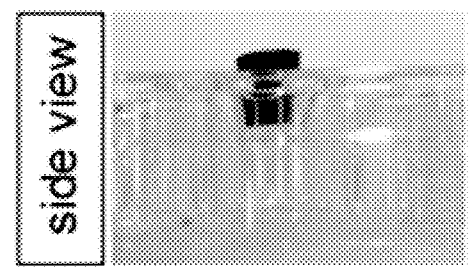

In addition, FIGS. 2A to 2C are photographs of a specific example of the culture container for culturing epithelial cells of the present embodiment. FIG. 2A is the photograph of the lid member and the upper container. Also, FIG. 2B shows the photograph obtained by accommodating the upper container with the lid member fitted to the opening portion, in the lower container and imaging from a lid member side, and FIG. 2C shows the photograph obtained by imaging from a side surface of the upper container and the lower container.

As will be described later in examples, the culture container for culturing epithelial cells of the present embodiment makes it possible to culture epithelial cells in a plane, easily control the oxygen partial pressure on an apical membrane side and a basement membrane side, and culture the cells in an environment closer to an internal side of a living body.

In the internal side of the living body, epithelial cells are present in organs such as a digestive tract, a respiratory organ or a respiratory tract, and epidermis. The cell membrane of an epithelial cell on a luminal side of each organ is called an apical membrane, and the cell membrane on a blood vessel side is called a basement membrane.

In the example of FIG. 1, an apical membrane side 151 of the epithelial cell 150 faces an internal space of the upper container 110. Further, a basement membrane side 152 of the epithelial cell 150 faces a surface of the upper container 110. It can be said that the basement membrane side 152 of the epithelial cell 150 faces the membrane 113 or faces a bottom surface of the lower container 140.

As will be described later in examples, the inventors have clarified that when culturing the epithelial cells 150 in the inside portion of the upper container 110 in a state where the lid member 120 is fitted to the opening portion 111 of the upper container 110 and the epithelial cells 150 are in a confluent state, the upper container 110 is in an isolated state and the inside portion of the upper container 110 can be maintained in an anaerobic condition. On the other hand, since oxygen is supplied from the cell culture medium 130 to the basement membrane side 152 of the epithelial cell 150 through the membrane 113, the epithelial cell 150 can survive permanently.

In addition, as will be described later in examples, the inventors have clarified that when inoculating the apical membrane side of epithelial cells 150 with the anaerobic bacteria, the anaerobic bacteria can be brought into contact with epithelial cells 150 without being exposed to oxygen. When co-culturing the epithelial cells and the anaerobic bacteria in the culture container for culturing epithelial cells of the present embodiment, the anaerobic bacteria can access the apical membrane side of the epithelial cell and efficiently contact cell-derived products (which can be nutrients for some bacteria) such as mucopolysaccharides secreted by epithelial cells. As a result, the anaerobic bacteria that could not be conventionally cultured can be easily cultured using epithelial cells as a host factor.

Therefore, the culture container for culturing epithelial cells of the present embodiment can be used for mass culturing of anaerobic bacteria, which could not be mass cultured in the related art. In addition, it is possible to easily and efficiently analyze, in vitro, a measurement of an interaction between epithelial cells and anaerobic bacteria, a measurement of a nutritional metabolism state of intestinal bacteria, a measurement of a change in a gene expression of epithelial cells by anaerobic bacteria, and the like.

In the culture container for culturing epithelial cells of the present embodiment, the lid member needs to be formed of a material that impermeable to oxygen or has a small oxygen permeability coefficient. Therefore, as the material of the lid member, a material having an oxygen permeability coefficient of $1.0 \times 10^{-6}$ cm$^3$ cm/(cm$^2 \cdot$sec$\cdot$atm) or less is used. It is preferable to use a value at 25° C. for the oxygen permeability coefficient. That is, as the material of the lid member, a material in which the amount of oxygen permeated per second in an area of 1 cm$^2$, at a pressure of 1 atm, and at a temperature of 25° C. in a case where a thickness is converted to 1 cm is $1.0 \times 10^{-6}$ cm$^3$ or less is used.

Examples of the materials having the oxygen permeability coefficient of $1.0 \times 10^{-6}$ cm$^3$ cm/(cm$^2 \cdot$sec$\cdot$atm) or less include butyl rubber, ethylene propylene rubber, perfluoroelastomer, styrene butadiene rubber, fluororubber, chloroprene rubber, and nitrile rubber, and are not limited thereto.

In the culture container for culturing epithelial cells of the present embodiment, the lid member 120 or the upper container 110 may further comprise an oxygen scavenger portion configured to hold an oxygen scavenger.

In order to set the inside portion of the upper container 110 to be in the anaerobic condition, it is preferable to perform replacement the medium in the inside portion of the upper container 110, inoculation with the anaerobic bacteria, and fitting of the lid member 120 to the opening portion of the upper container 110, and the like, in a low oxygen atmosphere. Here, the low oxygen atmosphere refers to an atmosphere where an oxygen concentration in the atmosphere is, for example, 15% by volume or less, for example, 10% by volume or less, for example, 5% by volume or less, for example, 0.5% by volume or less, for example, 0.3% by volume or less, and for example, 0.1% by volume or less. In order to obtain the low oxygen atmosphere, a special device such as a nitrogen chamber is required. However, when the lid member 120 or the upper container 110 further comprises the oxygen scavenger portion configured to hold the oxygen scavenger, the oxygen scavenger portion absorbs or removes oxygen in the inside portion of the upper container 110 as long as the lid member 120 is airtightly fitted to the opening portion of the upper container 110 even without the nitrogen chamber, and the inside portion of the upper container 110 can be made into the anaerobic condition.

The oxygen scavenger is not particularly limited as long as it does not adversely affect the culture of cells or bacteria, and an agent that absorbs oxygen by utilizing the oxidation of iron, an organic agent that utilizes an oxidation reaction of sugar, reductone, or the like, and the like can be used.

[Method for Culturing Epithelial Cells]

In one embodiment, the present invention provides a method for culturing epithelial cells, including a step (a) of coating a surface of the upper container of the culture container for culturing epithelial cells with an extracellular matrix, a step (b) of accommodating the cell culture medium and the upper container in the lower container, a step (c) of inoculating the extracellular matrix with an epithelial cell, a step (d) of incubating the culture container for epithelial cells under a culture condition to form a layer of a 2D organoid on the extracellular matrix by the epithelial cell, a step (e) of airtightly fitting the lid member to the opening portion of the upper container, and a step (f) of further incubating the culture container for epithelial cells under the culture condition.

As will be described later in examples, the culture method of the present embodiment makes it possible to culture epithelial cells in a plane, easily control the oxygen partial pressure on an apical membrane side and a basement membrane side, and culture the cells in an environment closer to an internal side of a living body. Hereinafter, each step will be described.

(Step (a))

First, in the present step, a surface of the upper container of the culture container for culturing epithelial cells described above is coated with an extracellular matrix. Accordingly, it becomes easier to form a 2D organoid described later.

<<Extracellular Matrix>>

In general, the extracellular matrix (ECM) means a supramolecular structure existing outside a cell in an organism. The ECM provides a scaffold for epithelial cells to grow. The ECM contains various polysaccharides, water, elastin, and glycoprotein. Examples of the glycoprotein include collagen, entactin (nidogen), fibronectin, and laminin.

As the ECM, for example, commercially available products such as Matrigel (registered trademark, BD Bioscience), Cellmatrix (Nitta Gelatin), extracellular matrix protein (Thermo Fisher Scientific Co., Ltd.), ProNectin (SigmaZ378666) can be used.

Alternatively, ECM may be prepared and used. Examples of the method for preparing the ECM include a method using connective tissue cells. More specifically, when ECM-producing cells, for example, fibroblasts are cultured in the culture container and then these cells are taken out, the surface of the culture container is coated with the ECM.

Examples of the ECM-producing cells include chondrocytes that mainly produce collagen and proteoglycan, fibroblasts that mainly produce type IV collagen, laminin, interstitial procollagen, and fibronectin, and colonic myofibroblasts that mainly produce collagen (type I, type III, and type V), chondroitin sulfate proteoglycan, hyaluronic acid, fibronectin, and tenascin-C.

(Step (b))

In the present step, the cell culture medium and the upper container are accommodated in the lower container. The cell culture medium will be described later.

(Step (c))

In the present step, the extracellular matrix with which the surface of the upper container is coated is inoculated with epithelial cells. Either of the step (b) or (c) may be performed first. Finally, the cell culture medium and the upper container may be accommodated in the lower container, and the upper container may be inoculated with epithelial cells.

<<Epithelial Cells>>

In the present specification, an epithelial cell is a cell containing differentiated epithelial cell and epithelial stem cell obtained from epithelial tissue. The "epithelial stem cell" means a cell having a long-term self-renewal function and an ability to differentiate into an epithelial differentiated cell, and means a stem cell derived from the epithelial tissue. Examples of the epithelial tissue include cornea, oral mucosa, skin, conjunctiva, bladder, tubules, kidneys, digestive organs (esophagus, stomach, duodenum, small intestine (including jejunum and ileum), and large intestine (including colon)), liver, bile duct, pancreas, mammary gland, salivary gland, tear gland, prostate, hair root, trachea, lung, and oviduct. The epithelial cell may also be epithelial tumor cell in which the cell derived from the epithelial tissue described above has become a tumor.

The method for culturing epithelial cells of the present embodiment is preferably used for culturing epithelial cells derived from anaerobic organs in an internal side of a living body. For example, the method is preferably used for culturing epithelial cells derived from the digestive organs (esophagus, stomach, duodenum, small intestine (including jejunum and ileum), and large intestine (including colon)), liver, and pancreas.

In the method for culturing epithelial cells of the present embodiment, the epithelial cells may be epithelial cells obtained from epithelial tissue, but it is more preferable that the epithelial cell is a cell in which a 3D organoid of three-dimensionally cultured epithelial cells is dispersed in a single cell.

In the present specification, the term "3D organoid" means a three-dimensional cell tissue body that is self-assembled by accumulating cells at a high density in a controlled space. It is preferable that both stem cell and differentiated cell are maintained in the 3D organoid. A method for preparing the 3D organoid is not particularly limited, and examples thereof include the following methods.

First, epithelial cells are embedded in a cell matrix, a plate is inoculated therewith and is allowed to stand. The epithelial cell preferably contains a LGR5-positive epithelial stem cell. Subsequently, after cell inoculating, a cell culture medium is added and cultured before the cell is dried. The cell culture medium will be described later. The culture temperature is preferably 30° C. to 40° C., and more preferably about 37° C. The culture time can be appropriately adjusted depending on the cell used. It is general that the 3D organoid is formed about 1 to 2 weeks after the start of culturing. In this manner, the 3D organoid can be prepared.

In the formation of the 3D organoid, culture may be carried out in a hypoxic condition. When performing the culture in the hypoxic state, the efficiency of 3D organoid formation can be improved. The hypoxic condition is preferably a condition in which the oxygen concentration is 0.1% to 15% by volume, more preferably 0.3% to 10% by volume, and still more preferably 0.5% to 5% by volume.

Subsequently, the obtained 3D organoid is dispersed in a single cell and the extracellular matrix with which the surface of the upper container of the culture container for culturing epithelial cells is coated is inoculated therewith.

Examples of the method for preparing a single cell from the 3D organoid are not particularly limited, and examples thereof include a physical method and an enzyme treatment method. The enzyme treatment method is preferable from a viewpoint of not damaging the cell. As the enzyme used in the enzyme treatment method, TrypLE Express (Thermo Fisher Scientific Co., Ltd.), trypsin, collagenase, dispase I, and the like can be used.

(Step (d))

Subsequently, the culture container for epithelial cells, inoculated with the epithelial cell in the step (c) is incubated under a culture condition. As a result, epithelial cells form a monolayer of a 2D organoid on the extracellular matrix, as described later in the examples.

Examples of the culture condition include an environment of 37° C. Also, examples of a gas condition around the culture container for epithelial cells include air and a hypoxic condition. The hypoxic condition is similar to the condition described above.

The 2D organoid is an organoid in which cells having the same function as the cells forming the 3D organoid are arranged two-dimensionally instead of three-dimensionally. It is preferable that both stem cell and differentiated cell are maintained in the 2D organoid.

<<Cell Culture Medium>>

As the cell culture medium, a medium capable of maintaining a stem cell contained in the epithelial cell in an undifferentiated state (hereinafter, may be referred to as an "expansion medium") is preferably used.

Examples of such a medium include a medium containing at least one selected from the group consisting of insulin-like growth factor 1 (IGF1), fibroblast growth factor 2 (FGF2), and EGF-like growth factor, and at least one selected from the group consisting of a Wnt agonist, a bone morphogenetic factor (BMP) inhibitor, and a transforming growth factor-β (TGF-β) inhibitor. The cell culture medium may further contain a p38 inhibitor. Examples of the EGF-like growth factor include epidermal growth factor (EGF), epiregulin (EREG), and HBGF etc. The Wnt agonists also include a complex of Wnt protein and afamin.

The inventors have previously clarified that such a medium makes it possible to obtain an organoid from tissue for which it has been difficult to produce an organoid in the prior art. The cell culture medium is preferably serum-free.

<<Basal Medium>>>

The cell culture medium is a medium obtained by adding the above components to a basal medium. The basal medium comprises any serum-free cell culture basal medium. Examples of the serum-free cell culture basal medium include a synthetic medium buffered with a carbonic acid-based buffer solution to pH 7.2 to 7.6. More specifically, examples thereof include Advanced-Dulbecco's modified Eagle medium/Ham F-12 mixed medium (Dulbecco's Modified Eagle Medium: Nutrient Mixture F-12, DMEM/F12) supplemented with glutamine, insulin, B27 supplement (Thermo Fisher Scientific Co., Ltd.), N-Acetyl-L-cystein (Wako Pure Chemical Industries, Ltd.), penicillin or streptomycin, and transferrin. Alternatively, RPMI 1640 medium (Roswell Park Memorial Institute 1640 medium), Advanced RPMI medium, and the like may be used as the basal medium.

<<IGF1>>

The IGF1 is also known as somatomedin C. The concentration of IGF1 contained in the cell culture medium is not particularly limited, and is preferably 5 ng/mL to 1 μg/mL, more preferably 10 ng/mL to 1 µg/mL, and still more preferably 50 ng/mL to 500 ng/mL.

<<FGF2>>

The FGF2 is a basic fibroblast growth factor, and has functions of binding to a fibroblast growth factor receptor (FGFR) and promoting growth of vascular endothelial cells and organization into a tubular structure, that is, angiogenesis. The concentration of FGF2 contained in the cell culture medium is not particularly limited, and is preferably 5 ng/mL to 1 µg/mL or lower, more preferably 10 ng/mL to 1 µg/mL or lower, and still more preferably 50 ng/mL to 500 ng/mL or lower.

<<EGF-Like Growth Factor>>

Examples of the EGF-like growth factor include EGF, EREG, and HBGF. The concentration of EGF contained in the cell culture medium is not particularly limited, and is preferably 5 ng/mL to 1 µg/mL, more preferably 10 ng/mL to 1 µg/mL, and still more preferably 50 ng/mL to 500 ng/mL. EREG is the EGF-like growth factor that specifically binds to ErbB1 and ErbB4 among tyrosine kinase (ErbB) family receptors (ErbB1-4). The concentration of EREG contained in the cell culture medium is not particularly limited, and is preferably 5 ng/mL to 1 µg/mL, more preferably 10 ng/mL to 1 µg/mL, and still more preferably 50 ng/mL to 500 ng/mL.

<<BMP Inhibitor>>

The BMP binds to a receptor complex formed of two different kinds of type I and type II serine/threonine kinase receptors, as a dimeric ligand. The type II receptor phosphorylates the type I receptor, resulting in activation of a receptor kinase. The type I receptor subsequently phosphorylates a specific receptor substrate (SMAD), resulting in transcriptional activity induced by a signaling pathway. In general, the BMP inhibitor is, for example, an agent that blocks or inhibits the binding of a BMP molecule to a BMP receptor, and binds to the BMP molecule to form a complex that neutralizes the BMP activity. Also, the BMP inhibitor is, for example, an agent that binds to a BMP receptor and blocks or inhibits the binding of a BMP molecule to the receptor, and acts as an antagonist or inverse agonist.

The BMP inhibitor has inhibitory activity of preferably 50% or more, more preferably 70% or more, still more preferably 80% or more, and particularly preferably 90% or more, as compared with a BMP activity level in the absence of the inhibitor. The BMP inhibitory activity can be evaluated, for example, by measuring a transcriptional activity of BMP.

The BMP inhibitor contained in the cell culture medium is preferably a natural BMP-binding protein, and examples thereof include a chordin-like protein such as Noggin, Gremlin, Chordin, and Chordin domain; Follistatin-related proteins such as Follistatin and Follistatin domain; DAN-like proteins such as DAN and DAN cysteine-knot domain; and sclerostin/SOST, decorin, and α-2 macroglobulin.

Among these, as the BMP inhibitor, the chordin-like protein or the DAN-like protein is preferable, and the chordin-like protein is more preferable. As the chordin-like protein, noggin is preferable. The chordin-like protein and the DAN-like protein are diffusible proteins that can bind to a BMP molecule with various affinities and inhibit the access of the BMP molecule to a signal transduction receptor.

The concentration of the BMP inhibitor contained in the cell culture medium is preferably 10 to 100 ng/mL, more preferably 20 to 100 ng/mL, and still more preferably 50 to 100 ng/mL.

<<TGF-β Inhibitor>>

The transforming growth factor-β (TGF-β) is one kind of a growth factor and is produced in almost all cells such as kidney, bone marrow, and platelets. There are five subtypes (β1 to β5) of TGF-β. In addition, TGF-β is known to promote the growth of osteoblasts and the synthesis and growth of connective tissue such as collagen, and to suppress the growth of epithelial cells and osteoclasts. In general, the TGF-β inhibitor is, for example, an agent that blocks or inhibits the binding of the TGF-β to a TGF-β receptor, and binds to the TGF-β to form a complex that neutralizes TGF-β activity. Also, the TGF-β inhibitor is, for example, an agent that binds to the TGF-β receptor and blocks or inhibits the binding of a TGF-β molecule to the receptor, and acts as an antagonist or inverse agonist.

The TGF-β inhibitor has inhibitory activity of preferably 50% or more, more preferably 70% or more, still more preferably 80% or more, and particularly preferably 90% or more, as compared with a TGF-β activity level in the absence of the inhibitor.

Examples of the TGF-β inhibitor contained in the cell culture medium include A83-01 (3-(6-methylpyridine-2-yl)-1-phenylthiocarbamoyl-4-quinoline-4-ylpyrazole), ALK5 Inhibitor I (3-(pyridin-2-yl)-4-(4-quinonyl)-1H-pyrazole), LDN193189 (4-(6-(4-(piperazin-1-yl)phenyl)pyrazolo[1,5-a]pyrimidin-3-yl)quinoline), SB431542 (4-[4-(1,3-benzodi-oxole-5-yl)-5-pyridine-2-yl-1H-imidazol-2-yl]benzamide), SB-505124 (2-(5-benzo[1,3]dioxol-5-yl-2-tert-butyl-3H-imidazol-4-yl)-6-methylpyridine hydrochloride hydrate), SD-208 (2-(5-chloro-2-fluorophenyl) pteridine-4-yl) pyridin-4-yl-amine), SB-525334 (6-[2-(1,1-dimethylethyl)-5-(6-methyl-2-pyridinyl)-1H-imidazol-4-yl]quinoxaline), LY-364947 (4-[3-(2-pyridinyl)-1H-pyrazole-4-yl]-quinoline), LY2157299 (4-[2-(6-methyl-pyridine-2-yl)-5,6-dihydro-4H-pyrrolo[1,2-b]pyrazole-3-yl]-quinoline-6-carboxylic acid amide), TGF-β RI Kinase Inhibitor II 616452 (24346-methylpyridine-2-yl)-1H-pyrazole-4-yl)-1,5-naphthyridine), TGF-β RI Kinase Inhibitor III 616453 (2-(5-benzo[1,3]dioxol-4-yl-2-tert-butyl-1H-imidazol-4-yl)-6-methylpyridine, HCl), TGF-β RI Kinase Inhibitor IX 616463 (4-((4-((2,6-dimethylpyridine-3-yl)oxy)pyridin-2-yl)amino)benzenesulfonamide), TGF-β RI Kinase Inhibitor VII 616458 (1-(2-((6,7-dimethoxy-4-quinolyl)oxy)-(4,5-dimethylphenyl)-1-ethanone), TGF-β RI Kinase Inhibitor VIII 616459 (6-(2-tert-butyl-5-(6-methyl-pyridine-2-yl)-1H-imidazole-4-yl)-quinoxaline), AP12009 (TGF-β2 antisense compound "Trabedersen"), Belagenpumatucel-L (TGF-β2 antisense gene-modified allogeneic tumor cell vaccine), CAT-152 (Glaucoma-lerdelimumab (anti-TGF-β-2 monoclonal antibody)), CAT-192 (Metelimumab (human IgG4 monoclonal antibody that neutralizes TGFβ1), and GC-1008 (anti-TGF-β monoclonal antibody). Among these, the A83-01 is preferable as the TGF-β inhibitor contained in the cell culture medium for culturing organoid of the present embodiment.

The concentration of the TGF-β inhibitor contained in the cell culture medium is preferably 100 nM to 10 µM, more preferably 500 nM to 5 µM, and still more preferably 500 nM to 2 µM.

<<Wnt Agonist>>

In the present specification, the "Wnt agonist" means an agent that activates T-cell factor (hereinafter, also referred to as TCF)/lymphoid enhancer factor (hereinafter, also referred to as LEF)-mediated transcription in cells. The Wnt agonist is not limited to Wnt family proteins, and includes a Wnt agonist that binds to and activates Frizzled receptor family members, an intracellular β-catenin degradation inhibitor, and a TCF/LEF activator. The Wnt agonist is preferably at least one selected from the group consisting of Wnt protein, R-spondin, and a GSK-3β inhibitor.

As the Wnt agonist contained in the cell culture medium, a complex of the Wnt protein and the afamin is more preferable, and it is more preferable to contain both the complex of Wnt protein and afamin and the R-spondin.

<<Wnt Protein>>

The Wnt protein is not particularly limited, and Wnt proteins derived from various organisms can be used. Among these, a mammalian-derived Wnt protein is preferable. Examples of the mammal include humans, mice, rats, cows, pigs, and rabbits. Examples of the mammalian Wnt proteins include Wnt1, Wnt2, Wnt2b, Wnt3, Wnt3a, Wnt4, Wnt5a, Wnt5b, Wnt6, Wnt7a, Wnt7b, Wnt8a, Wnt8b, Wnt9a, Wnt9b, Wnt10a, Wnt10b, Wnt11, Wnt16, and the like. A plurality of kinds of the Wnt proteins may be used in combination.

Examples of a method for producing the Wnt protein include a production method using Wnt protein-expressing cells. In the Wnt protein-expressing cell, an origin of the cell (such as species and culturing form) is not particularly limited, and any cell that stably expresses the Wnt protein may be used, and a cell that transiently expresses the Wnt protein may also be used. Examples of the Wnt protein-expressing cell include an L cell that stably expresses mouse Wnt3a (ATCC CRL-2647) and an L cell that stably expresses mouse Wnt5a (ATCC CRL-2814). In addition, the Wnt protein-expressing cells can be produced using a known gene recombination technique. That is, the Wnt protein-expressing cell can be prepared by inserting a DNA encoding a desired Wnt protein into a known expression vector and introducing the obtained expression vector into an appropriate host cell. The nucleotide sequence of the gene encoding the desired Wnt protein can be obtained from a known database such as GenBank.

The Wnt protein expressed by the Wnt protein-expressing cells may be a fragment of the Wnt protein or may contain an amino acid sequence other than the amino acid sequence of the Wnt protein, as long as the Wnt protein has an Wnt activity. The amino acid sequence other than the amino acid sequence of the Wnt protein is not particularly limited, and examples thereof include an amino acid sequence of an affinity tag. Further, the amino acid sequence of the Wnt protein does not have to completely match the amino acid sequence obtained from the known database such as the GenBank, and may be substantially the same as the amino acid sequence obtained from a known database as long as the amino acid sequence has the Wnt activity.

Examples of the amino acid sequence substantially the same as the amino acid sequence of the Wnt protein that can be obtained from the known database such as the GenBank include an amino acid sequence in which one to several amino acids are deleted from, substituted with, or added to the amino acid sequence that can be obtained from the known database.

The amino acid sequence in which one to several amino acids are deleted, substituted, or added means that, for example, the number (preferably 10 or less, more preferably 7 or less, and still further preferably 6 or less) of amino acids that can be deleted, substituted, or added by a mutant peptide preparation method such as a site-specific mutagenesis method have been deleted, substituted, or added.

Further, examples of the substantially the same amino acid sequence include an amino acid sequence having an identity of 80% or more, preferably 85% or more, more preferably 90% or more, still more preferably 92% or more, particularly preferably 95% or more, and most preferably 99% or more with the amino acid sequence that can be obtained from the known database.

<<R-Spondin>>

Examples of the R-spondin include an R-spondin family including R-spondin 1, R-spondin 2, R-spondin 3, and R-spondin 4. The R-spondin family is a secretory protein and is known to be involved in the activation and regulation of the Wnt signaling pathway. In the cell culture medium, a plurality of kinds of the R-spondin may be used in combination. Further, a fragment of the R-spondin may be used, or those containing the amino acid sequence other than the amino acid sequence of the R-spondin may be used, as long as these have an R-spondin activity.

The concentration of the Wnt protein contained in the cell culture medium is preferably 50 ng/mL or more, more preferably 100 ng/mL to 10 µg/mL, still more preferably 200 ng/mL to 1 µg/mL, and particularly preferably 300 ng/mL to 1 µg/mL.

<<GSK-3β Inhibitor>>

Examples of the GSK-3β inhibitor include CHIR-99021 (CAS number: 252917-06-9), CHIR-98014 (CAS number: 252935-94-7), lithium (Sigma), and Kenpaullone (CAS number: 142273-20-9), 6-Bromoindirubin-30-acetoxime, SB216763 (CAS number: 280744-09-4), SB415286 (CAS number: 264218-23-7), and a FRAT family member and a FRAT-derived peptide that block the interaction of the GSK-3 with the axin.

<<p38 Inhibitor>>

In the present specification, the "p38 inhibitor" means any inhibitor that directly or indirectly negatively regulates p38 signaling. In general, the p38 inhibitor binds to, for example, p38 and reduces an activity thereof. A p38 protein kinase is a part of a mitogen-activated protein kinase (MAPK) family. The MAPK is a serine/threonine-specific protein kinase that regulates various cellular activities such as gene expression, mitosis, differentiation, growth, and cell survival/apoptosis in response to environmental stress and extracellular stimuli such as inflammatory cytokines. The p38 MAPK exists as α, β, β2, γ, or δ isoform. The p38 inhibitor is also, for example, an agent that binds to at least one p38 isoform and reduces the activity thereof.

The p38 inhibitor has inhibitory activity of preferably 50% or more, more preferably 70% or more, still more preferably 80% or more, and particularly preferably 90% or more, as compared with a p38 activity level in the absence of the inhibitor. An inhibitory effect of the p38 inhibitor can be evaluated by a method known to those skilled in the art. Examples of such an evaluation system include a phosphorylation site-specific antibody detection method for Thr180/Tyr182 phosphorylation, a biochemical recombinant kinase assay, a tumor necrosis factor α (TNF-α) secretion assay, a DiscoverRx high-throughput screening platform for a p38 inhibitor, and a p38 activity assay kit (manufactured by Millipore, Sigma-Aldrich, or the like).

Examples of the p38 inhibitor contained in the cell culture medium include SB-202190 (4-(4-fluorophenyl)-2-(4-hydroxyphenyl)-5-(4-pyridyl)-1H-imidazole), SB-203580 (4-[4-(4-fluorophenyl)-2-[4-(methylsulfinyl)phenyl]-1H-imidazol-5-yl]pyridine), VX-702 (6-(N-carbamoyl-2), 6-difluoroanilino)-2-(2,4-difluorophenyl)pyridine-3-carboxyamide), VX-745 (5-(2,6-dichlorophenyl)-2-[2,4-difluorophenyl)thio]-6H-pyrimid[1,6-b]pyridazine-6-one), PD-169316 (4-(4-fluorophenyl)-2-(4-nitrophenyl)-5-(4-pyridyl)-1H-imidazole), RO-4402257 (6-(2,4-difluorophenoxy)-2-{[3-hydroxy-1-(2-hydroxyethyl)propyl]amino}-8-methylpyrido[2,3-D]]pyrimidine-7(8h)-one), and BIRB-796

(1-[5-tert-butyl-2-(4-methylphenyl)pyrazole-3-yl]-3-[4-(2-morpholine-4-yletoxy) naphthalene-1-yl]urea.

The concentration of the p38 inhibitor contained in the cell culture medium is preferably 50 nM or more and 100 µM or less, more preferably 100 nM or more and 50 µM or less, and still more preferably 100 nM or more and 10 µM or less. During culturing of stem cells, it is preferable to add the p38 inhibitor to the culture medium every two days, and it is preferable to replace the culture medium with a fresh one every four days.

<<Afamin>>

The afamin is a glycoprotein belonging to an albumin family and is known to be present in blood or body fluids. The serum contains the afamin derived from the animal from which the serum was collected. Since the serum contains impurities or the like other than the afamin, it is preferable that the cell culture medium does not contain the serum and contains afamin alone.

The origin of afamin is not particularly limited, and afamin derived from various organisms can be used. Among these, mammalian-derived afamin is preferable. The amino acid sequence of the main mammalian afamin and the nucleotide sequence of the gene encoding the amino acid sequence can be obtained from the known database such as the GenBank. For example, in the GenBank, the amino acid sequence of human afamin is AAA21612 and the nucleotide sequence of the gene encoding the same is registered with the accession number of L32140 and the amino acid sequence of usiafamin is DAA28569 and the nucleotide sequence of the gene encoding the same is registered with the accession number of GJ060968.

The afamin contained in the cell culture medium may be obtained by purifying natural afamin contained in serum or the like by a known method, or may be a genetic recombinant afamin.

The Wnt protein has strong hydrophobicity because a specific serine residue is modified with a fatty acid (palmitoleic acid). Therefore, it is widely known that the Wnt protein easily aggregates or denatures in an aqueous solution and thus is very difficult to be purified and stored. On the other hand, it has been reported that the modification of the specific serine residue with the fatty acid is essential for the physiological activity of the Wnt protein and is involved in the binding to the Frizzled receptor family member. In addition, there is also a finding that the Wnt protein binds to afamin on a one-to-one basis to form a complex in an aqueous solution and solubilizes while maintaining high physiological activity.

Therefore, the Wnt protein-afamin complex may be produced by using a method of culturing cells expressing both the Wnt protein and the afamin, and the Wnt protein-afamin complex may be produced by using a method of co-culturing the Wnt protein-expressing cells and the afamin-expressing cells.

The concentration of the afamin contained in the cell culture medium is not particularly limited, and is preferably 50 ng/mL to 10 µg/mL, more preferably 100 ng/mL to 1 µg/mL, and still more preferably 300 ng/mL to 1 µg/mL.

<<Other Components>>

The cell culture medium for culturing organoid of the present embodiment may further contain a Rock (Rho-kinase) inhibitor. Examples of the Rock inhibitor include Y-27632 ((R)-(+)-trans-4-(1-aminoethyl)-N-(4-pyridyl)cyclohexanecarboxamide dihydrochloride monohydrate), fasudil (HA1077) (5-(1,4-diazepine-1-ylsulfonyl)isoquinoline), and H-1152 ((S)-(+)-2-methyl-1-[(4-methyl-5-isoquinolinyl)sulfonyl)]-hexahydro-1H-1,4-diazepine dihydrochloride). When the Y-27632 is used as the Rock inhibitor, it is preferably added during the first 2 days of culturing epithelial cells dispersed in a single cell. The concentration of the Y-27632 contained in the cell culture medium is preferably about 10 µM.

The cell culture medium may be further supplemented with gastrin (or a suitable alternative such as Leu15-gastrin). The concentration of the gastrin (or a suitable alternative) contained in the cell culture medium is preferably 1 ng/mL to 10 µg/mL, more preferably 1 ng/mL to 1 µg/mL, and still more preferably 5 ng/mL to 100 ng/mL.

The cell culture medium may further contain at least one amino acid. Examples of the amino acid include L-alanine, L-arginine, L-asparagine, L-aspartic acid, L-cysteine, L-cysteine, L-glutamic acid, L-glutamine, L-glycine, L-histidine, and L-isoleucine, L-leucine, L-lysine, L-methionine, L-phenylalanine, L-proline, L-serine, L-threonine, L-tryptophan, L-tyrosine, L-valine, and a combination thereof. The concentration of the L-glutamine contained in the cell culture medium is preferably 0.05 to 1 g/L and more preferably 0.1 to 0.75 g/L. The amount of other amino acids contained in the cell culture medium is preferably 0.001 to 1 g/L and more preferably 0.01 to 0.15 g/L.

The cell culture medium may further contain at least one kind of vitamin Examples of the vitamin include thiamine (vitamin B1), riboflavin (vitamin B2), niacin (vitamin B3), calcium D-pantothenate (vitamin B5), pyridoxal/pyridoxamine/pyridoxin (vitamin B6), folic acid (vitamin B9), cyanocobalamine (vitamin B12), ascorbic acid (vitamin C), calciferol (vitamin D2), DL-α-tocopherol (vitamin E), biotin (vitamin H), and menadione (vitamin K).

The cell culture medium may further contain at least one kind of an inorganic salt. The inorganic salt has a function to help to maintain osmotic equilibrium of cells and also help to regulate the membrane potential. Specific examples of the inorganic salt include salts of calcium, copper, iron, magnesium, potassium, sodium, and zinc. The salts are usually used in the form of chloride, phosphate, sulfate, nitrate, or bicarbonate. More specific examples of the salt include $CaCl_2$, $CuSO_4$-$5H_2O$, $Fe(NO_3)$-$9H_2O$, $FeSO_4$-$7H_2O$, $MgCl$, $MgSO_4$, $KCl$, $NaHCO_3$, $NaCl$, $Na_2HPO_4$, $Na_2HPO_4$—$H_2O$, and $ZnSO_4$-$7H_2O$.

The cell culture medium may further contain at least one kind of sugar that can be a carbon energy source. Examples of the sugar include glucose, galactose, maltose, and fructose. Among these, the glucose is preferable, and the D-glucose (dextrose) is particularly preferable. The concentration of the sugar contained in the cell culture medium is preferably 1 to 10 g/L.

The cell culture medium may further contain at least one kind of trace element. Examples of the trace element include barium, bromine, cobalt, iodine, manganese, chromium, copper, nickel, selenium, vanadium, titanium, germanium, molybdenum, silicon, iron, fluorine, silver, rubidium, tin, zirconium, cadmium, zinc, aluminum, and ions thereof.

The cell culture medium may further contain at least one kind of additional agent. Examples of the agent include nutrients or growth factors that have been reported to improve stem cell culture, such as cholesterol, transferrin, albumin, insulin, progesterone, putrescine, and selenite.

(Step (e))

Subsequently, in the present step, the lid member is airtightly fitted to the opening portion of the upper container. The present step may be performed at any time after the step (c). For example, the step may be performed after the step (d). As will be described later in the Examples, when the present step is performed after the epithelial cells have formed a layer of confluent 2D organoid in the step (d), the upper container is isolated. In this case, when the present step is carried out in a low oxygen atmosphere, the inside portion of the upper container can be maintained in an anaerobic condition.

Examples of the method for carrying out the present step in a low oxygen atmosphere include carrying out the present step in a nitrogen chamber.

Further, even when the nitrogen chamber is not used, for example, when the lid member or the upper container further comprises an oxygen scavenger portion configured to hold the oxygen scavenger, the oxygen scavenger absorbs or removes oxygen in the inside portion of the upper container, and the inside portion of the upper container can be quickly in the anaerobic condition.

Alternatively, even when the lid member or the upper container does not have an oxygen scavenger portion without using the nitrogen chamber, the inside portion of the upper container is maintained in the anaerobic condition (hypoxic state) after the epithelial cells consume the oxygen in the upper container.

Further, when the lid member is airtightly fitted to the opening portion of the upper container before the epithelial cells form a layer of confluent 2D organoid and the culture container for culturing epithelial cells is incubated in the aerobic condition, oxygen is supplied into the upper container through a membrane that is placed in a part of the upper container, permeates at least a part of the component of the cell culture medium, and impermeable to the cells. Therefore, immediately after fitting the lid member, the inside portion of the upper container cannot be in the anaerobic condition.

However, even in such cases, the upper container is isolated after the epithelial cells have grown to form a layer of confluent 2D organoid within the upper container. Furthermore, after the epithelial cells consume the oxygen in the upper container, the inside portion of the upper container is maintained in a hypoxic state.

Further, after the step (d) and before the step (e), a step of inoculating the upper container, on which the layer of 2D organoid has been formed, with anaerobic bacteria may be further included.

After the epithelial cells have formed the layer of the confluent 2D organoid in the step (d), the inside portion of the upper container can be maintained in the anaerobic condition. Therefore, as will be described later in examples, when inoculating the apical membrane side of epithelial cells with the anaerobic bacteria, the anaerobic bacteria can be brought into contact with epithelial cells without being exposed to oxygen. As a result, the epithelial cells and the anaerobic bacteria can be co-cultured. In this case, it can be said that the method for culturing epithelial cells of the present embodiment is a method for co-culturing the epithelial cells and the anaerobic bacteria.

Further, when inoculating with the anaerobic bacteria, the medium in the inside portion the upper container may be replaced with a medium for bacteria in a hypoxic state. As will be described later in the examples, when the cell culture medium is accommodated in the lower container, the epithelial cells can be maintained even when the medium in the inside portion of the upper container is replaced with the bacterial culture medium. Examples of the bacterial culture medium include a modified GAM bouillon (NISSUI), a fortified *Clostridium* medium, a BHI medium, a BL medium, an LB medium, and an EG medium.

The anaerobic bacterium may be a bacterium that has been difficult to culture in the past. The anaerobic bacterium preferably uses the epithelial cells as a host factor. The anaerobic bacterium is not particularly limited, and bacteria belonging to the order Clostridiales, Bacteroidetes, Bifidobacteriaceae, Verrucomicrobia, Desulfovibrionales, and the like can be used.

(Step (f))

In the present step, the culture container for epithelial cells in which the lid member is airtightly fitted to the opening portion of the upper container is further incubated in the culture condition. Examples of the culture condition include the same condition as the culture conditions in the step (d).

Further, in the present step, the cell culture medium accommodated in the lower container may be replaced from a medium capable of maintaining the stem cells contained in the epithelial cells in an undifferentiated state (hereinafter, may be referred to as "expansion medium") with a medium that induces stem cell differentiation (hereinafter, may be referred to as "differentiation medium") to induce differentiation of the epithelial cells.

(Co-Culture of Epithelial Cells and Anaerobic Bacteria)

In one embodiment, the present invention provides a co-culture of a 2D organoid of epithelial cells with an anaerobic bacterium. In the prior art, epithelial cells had not been able to be cultured under an anaerobic condition. Therefore, in the prior art, it has not been possible to produce a co-culture of the 2D organoid of the epithelial cells and the anaerobic bacteria.

The co-culture of the present embodiment may be obtained by the above-mentioned method for culturing epithelial cells.

Using the co-culture of the present embodiment, measurement of interaction between epithelial cells and anaerobic bacteria, measurement of nutritional metabolism state of intestinal bacteria, measurement of a change in a gene expression of epithelial cells by anaerobic bacteria, screening for drugs that change the interaction between epithelial cells and anaerobic bacteria, and the like can be easily and efficiently analyzed in vitro.

EXAMPLES

Hereinafter, the present invention will be described in more detail with reference to Examples, but the present invention is not limited to the following examples.

Experimental Example 1

(Culture of Epithelial Cells)

Epithelial cells were cultured using the culture container for culturing epithelial cells shown in photographs of FIGS. 2A to 2C. As the upper container, a commercially available cell culture insert (trade name "ThinCert", Greiner Bio-One) or Transwell (trade name "Transwell", Corning) was used. In addition, the lid member was made by self-production. A butyl rubber was used as the material of the lid member. The oxygen permeability coefficient of butyl rubber is $0.99 \times 10^{-8}$ $cm^3$ $cm/(cm^2 \cdot sec \cdot atm)$. As the lower container, a commercially available 12-well plate or 48-well plate was used.

<<Preparation of Cell Culture Medium>>>

As a cell culture medium, a medium in which human recombinant R-spondin 1 (manufactured by R & D systems) was added so as to have a final concentration of 1 μg/mL, Noggin (manufactured by PeproTech) was added so as to have a final concentration of 100 ng/mL, A83-01 (manufactured by Tocris) was added so as to have a final concentration of 500 nM, culture supernatant derived from W-Wnt3a/

HEK cultured in a serum-containing medium was added so as to have a final concentration of Wnt3a of 300 ng/mL, IGF1 (manufactured by Biolegend) was added so as to have a final concentration of 100 ng/mL, FGF2 (manufactured by PeproTech) was added so as to have a final concentration of 50 ng/mL, mouse recombinant EGF (Life Technologies) was added so as to have a final concentration of 50 ng/mL, and Y-27632 (Rock inhibitor, manufactured by Wako Pure Chemical Industries, Ltd.) was added so as to have a final concentration of 10 µM, to a commercially available Advanced DMEM/F-12 medium (manufactured by Thermo Ficher SCIENTIFIC Co., Ltd.) was prepared. Hereinafter, the medium may be referred to as an MHCO (Modified human colonic organoid) medium.

<<Preparation of 3D Organoid>>

Based on the ethical research plan approved by the Institutional Review Board of Keio University School of Medicine, from patients with gastrointestinal tumors who have received explanation and have given consent, a part at least 5 cm or more away from the gastrointestinal tumor was collected as normal mucosa. The collected tissue was extracted with intestinal epithelial cells by EDTA or Liberase TH and embedded in Matrigel (registered trademark). Subsequently, a 48-well plate was inoculated with intestinal epithelial cells together with 25 µL of Matrigel (registered trademark) (manufactured by BD Bioscience). Subsequently, 100 µL of the above-mentioned cell culture medium was added to the wells, and the cells were cultured at 37° C. The medium was changed every 2 days from the start of the culture, and the cells were cultured for 7 days to obtain 3D organoids.

<<Preparation of Culture Container for Culturing Epithelial Cells>>

5% Matrigel (registered trademark) diluted with Advanced DMEM/F-12 medium or 10% Cellmatrix type I-C and type IV (Nitta Gelatin) diluted 10-fold with 0.1 M hydrochloric acid was added to the upper container of the culture container for culturing epithelial cells shown in photographs of FIGS. 2A to 2C, in the amount of 50 µL in the case of 24-well size and 200 µL in the case of 12-well size, and incubated at 37° C. for 30 minutes or longer, and dried for 30 to 60 minutes in a clean bench. Then, the upper container was washed 3 times with Advanced DMEM/F-12 medium and used for the following cell culture.

<<Preparation of 2D Organoids>>

The above-mentioned 3D organoid was disrupted using TrypLE Express (Thermo Fisher Scientific Co., Ltd.) to form a single cell. Subsequently, the obtained single cells were suspended in the above-mentioned MHCO medium, and in a case of 24-well size, an upper container was inoculated with 2 to 4×10$^5$ cells, cultured in an incubator for 3-5 days in the normal presence of oxygen at 37° C. until confluent. A plurality of culture containers for culturing epithelial cells were similarly inoculated with cells.

Subsequently, one of the confluent culture containers for culturing epithelial cells was incubated under normal oxygen presence conditions.

In addition, one of the confluent culture containers for culturing epithelial cells was incubated in an anaerobic chamber in the absence of oxygen. As a result, both the inside portion of the upper container and the inside portion of the lower container were maintained under anaerobic conditions.

Further, the medium of one upper container of the confluent culture container for culturing epithelial cells was replaced with the cell culture medium previously set in an anaerobic state in an anaerobic chamber, and the lid member was fitted to the opening portion of the upper container, and incubated in a normal oxygen atmosphere. As a result, the inside portion of the upper container was maintained under anaerobic conditions, and the inside portion of the lower container was maintained under aerobic conditions. The inside portion of the upper container faces the apical membrane side of the epithelial cells, and the inside portion of the lower container faces the basement membrane side of the epithelial cells.

Figure 3A:
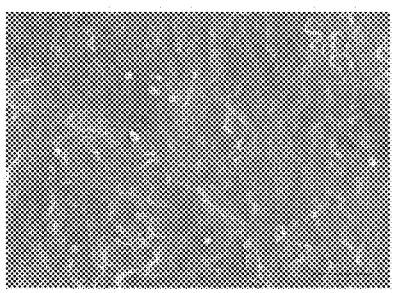
FIGS. 3A to 3C are micrographs of epithelial cells cultured in Experimental Example 1.
Figure 3B:
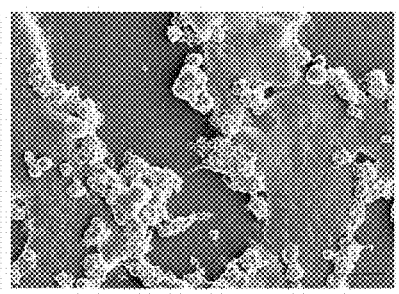
Figure 3C:
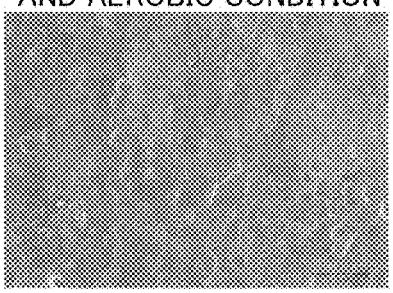

FIGS. 3A to 3C are typical photographs obtained by imaging epithelial cells in each culture container for culturing epithelial cells by an electron microscope. The scale bar is 50 µm. In FIG. 3A, the "aerobic condition" indicates a result of maintaining both the inside portion of the upper container and the inside portion of the lower container in an oxygen atmosphere. In FIG. 3B, the "anaerobic condition" indicates a result of maintaining both the inside portion of the upper container and the inside portion of the lower container in an anaerobic condition. In FIG. 3C, the "anaerobic/aerobic condition" indicates a result of maintaining the inside portion of the upper container in an anaerobic condition and maintaining the inside portion of the lower container in an aerobic condition. FIGS. 3A and 3C were taken 5 days after the start of the culture, and FIG. 3B was taken 6 hours after the start of the culture.

As a result, as shown in FIG. 3A, the survival of epithelial cells could be maintained under aerobic conditions. On the other hand, when both the apical membrane side and the basement membrane side of the epithelial cells were maintained in anaerobic conditions as shown in FIG. 3B, the cells could not be maintained alive and some cells died and an exfoliated state thereof was observed. On the other hand, as shown in FIG. 3C, even when the apical membrane side of the epithelial cells was maintained under anaerobic conditions, if the basement membrane side was maintained under aerobic conditions, it was clarified that the epithelium cells was affected by oxygen supplied from the basement membrane side and the epithelial cells can stay alive. Further, as will be described later, in FIG. 3C, it was confirmed that a mature 2D organoid was formed.

Experimental Example 2

(Measurement of Oxygen Concentration)

In the same manner as in Experimental Example 1, intestinal epithelial cells were cultured in the culture container for culturing epithelial cells shown in photographs of FIGS. 2A to 2C. The inside portion of the upper container was maintained under anaerobic conditions, and the inside portion of the lower container was maintained under aerobic conditions. For comparison, a sample in which the same operation as in Experimental Example 1 was performed except that inoculation with the epithelial cells was not performed, and a sample in which the epithelial cells were cultured without fitting the lid member to the opening portion of the upper container were also prepared.

Subsequently, 3 days after inoculating the upper container with the epithelial cells, the dissolved oxygen concentration in the cell culture medium in the upper container and the dissolved oxygen concentration in the cell culture medium in the lower container were measured for each group of samples. A commercially available dissolved oxygen meter (needle type non-destructive oxygen meter, product name "Microx4/Microx4 trace", PreSens) was used for measuring the dissolved oxygen concentration.

Figure 4A:
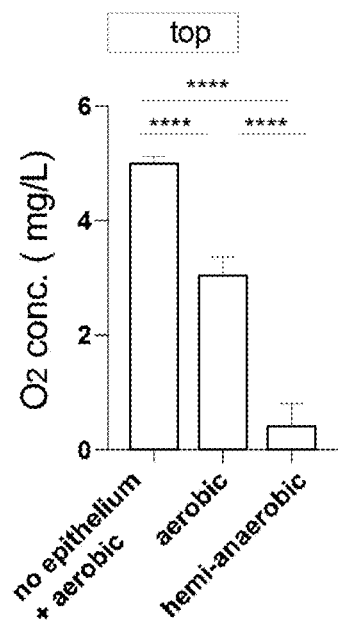
FIGS. 4A and 4B are graphs showing measurement results of dissolved oxygen concentration in Experimental Example 2.
Figure 4B:
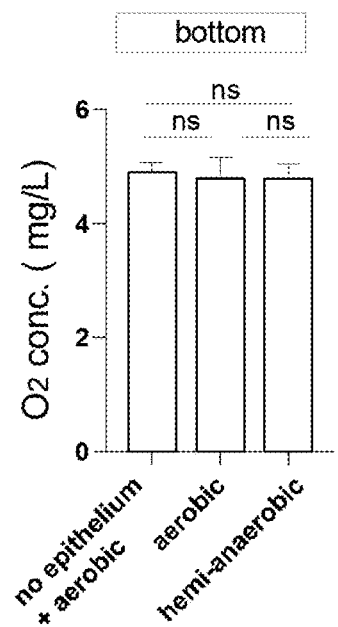

FIGS. 4A and 4B are graphs showing the measurement results of the dissolved oxygen concentration. FIG. 4A is a graph showing the measurement result of the dissolved oxygen concentration in the cell culture medium in the upper container, and FIG. 4B is a graph showing the measurement result of the dissolved oxygen concentration in the cell culture medium in the lower container. In FIGS. 4A and 4B, the "top" indicates a result in the upper container. The "bottom" indicates a result in the lower container. The "no epithelium+aerobic" indicates a result of the culture container for culturing epithelial cells not inoculated with the epithelial cells. The "aerobic" indicates a result of the culture container for culturing epithelial cells inoculated with the epithelial cells and without the lid member fitted to the opening portion of the upper container. The "hemi-anaerobic" indicates a result of a culture container for culturing epithelial cells inoculated with epithelial cells and having the lid member fitted to the opening portion of the upper container. Further, "****" indicates that there is a significant difference at $p<0.0001$, and "ns" indicates that there is no significant difference.

As a result, it was confirmed that in the culture container for culturing epithelial cells inoculated with epithelial cells and having the lid member fitted to the opening portion of the upper container, the dissolved oxygen concentration in the cell culture medium in the upper container was low, and the anaerobic condition was maintained. On the other hand, it was confirmed that the dissolved oxygen concentration in the cell culture medium in the lower container was high and maintained in an aerobic condition. It was also confirmed that when inoculation with the epithelial cells was not performed, the dissolved oxygen concentration in the cell culture medium in the upper container was high and the anaerobic condition could not be maintained. Further, it was confirmed that even in a case where inoculating with the epithelial cells was performed and the lid member was not fitted to the opening portion of the upper container, the dissolved oxygen concentration in the cell culture medium in the upper container was high, and the anaerobic condition cannot be maintained.

From the above results, it was clarified that in a case where the lid member was fitted to the opening portion of the upper container, when the epithelial cells in the upper container formed 2D organoids and became confluent, the inside portion of the upper container is isolated and anaerobic conditions could be maintained.

Experimental Example 3

(Examination of 2D Organoid 1)

The intestinal epithelial cells were cultured while keeping the inside of the upper container under anaerobic conditions, using the culture container for culturing epithelial cells shown in photographs of FIGS. 2A to 2C, it was examined whether it is possible to maintain epithelial stem cells and whether it is possible to maintain differentiated cells.

First, in the same manner as in Experimental Example 1, a layer of confluent 2D organoid was formed on the surface of the upper container. Subsequently, the medium in the upper container was replaced in the anaerobic chamber. Two sets of similar culture containers for culturing epithelial cells were prepared. In one of the culture containers for culturing epithelial cells, the lid member was fitted to the opening portion of the upper container, and in the other, the lid member was not fitted to the opening portion of the upper container. These cells were incubated at 37° C. in an air environment. As a result, the inside portion of the upper container was maintained under anaerobic conditions, and the inside portion of the lower container was maintained under aerobic conditions.

Subsequently, 3 days after the medium exchange, each epithelial cell was collected, and the expression levels of the stem cell marker gene and the differentiation marker gene were measured by quantitative RT-PCR. As stem cell markers, the expression levels of the LGR5 gene and the PTK7 gene were measured. As differentiation markers, the expression levels of the MUC2 gene, which is a marker for goblet cells, the CHGA gene, which is a marker for neuroendocrine cells, and the AQP8 gene, which is a marker for large intestine cells, were measured.

FIGS. 5A to 5E are graphs showing the measurement results of the expression level of each gene. In FIGS. 5A to 5E, the vertical axis shows the relative value of the expression level of each gene. The "aerobic" indicates a result of culturing without fitting the lid member to the opening portion of the upper container. The "hemi-anaerobic" indicates a result of culturing by fitting the lid member to the opening portion of the upper container, and the "ns" indicates that there is no significant difference.

Figures 5A, 5B, 5C, 5D, 5E:
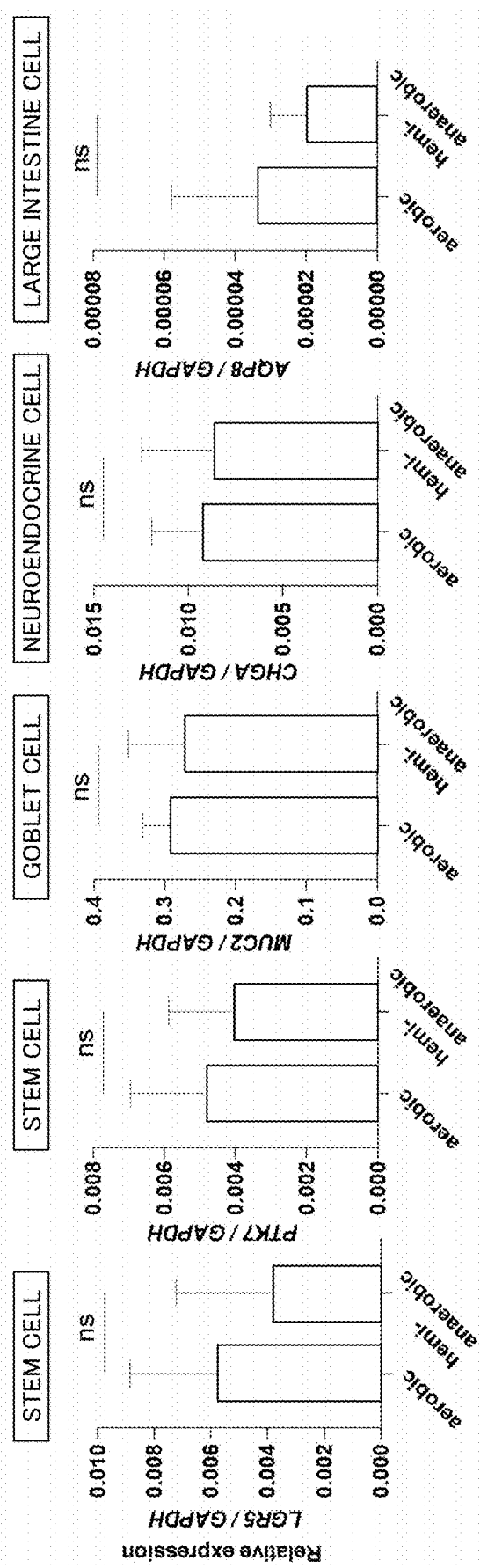
FIGS. 5A to 5E are graphs showing measurement results of an expression level of each marker gene measured in Experimental Example 3.

Further, FIG. 5A is a graph showing a result of measuring the expression level of mRNA of LGR5 gene. FIG. 5B is a graph showing a result of measuring the expression level of mRNA of PTK7 gene. FIG. 5C is a graph showing a result of measuring the expression level of mRNA of MUC2 gene. FIG. 5D is a graph showing a result of measuring the expression level of mRNA of CHGA gene. FIG. 5E is a graph showing a result of measuring the expression level of mRNA of AQP8 gene.

As a result, it was clarified that even in a case where the lid member was fitted to the opening portion of the upper container to maintain the apical membrane side of the epithelial cells under the anaerobic condition and the basement membrane side under the aerobic condition, not only the epithelial stem cells but also all functional differentiated cells constituting the large intestine epithelium can be maintained and cultured as in the case of culturing under the aerobic condition without the lid member fitted to the opening portion of the upper container.

FIGS. 6A and 6B are fluorescence micrographs of the above epithelial cell sections stained with an antibody against the MUC2 protein, which is a marker for goblet cells. F-actin was stained with phalloidin as a contrast. The scale bar is 20 µm. In FIGS. 6A and 6B, the upward facing side is the upper end membrane side and the downward facing side is the basement membrane side. Further, in FIG. 6A, the "aerobic condition" indicates a result of maintaining both the inside portion of the upper container and the inside portion of the lower container in an aerobic condition, and in FIG. 6B, the "anaerobic/aerobic condition" indicates a result of maintaining the inside portion of the upper container in an anaerobic condition and the inside portion of the lower container in an aerobic condition.

From the results of immunostaining shown in FIG. 6A, it was clarified that in 2D organoid culture under aerobic conditions, a layered structure is formed by mucin produced from goblet cells as well as in the intestinal tract of a living body. Also, from the results of immunostaining shown in FIG. 6B, it was clarified that even in a case where the apical membrane side of the epithelial cells was maintained under anaerobic conditions and the basement membrane side was maintained under aerobic conditions, a layered structure formed by mucin from goblet cells was observed similarly in the aerobic conditions.

Experimental Example 4

(Examination of 2D Organoids 2)

It was examined whether epithelial cells could be maintained and whether differentiated cells could be maintained even in a case where the intestinal epithelial cells were cultured in the culture container for culturing epithelial cells shown in photographs of FIGS. 2A to 2C, the lid member was fitted to the opening portion of the upper container to maintain the apical membrane side of the epithelial cells in an anaerobic condition and the basement membrane side in an aerobic condition.

First, in the same manner as in Experimental Example 1, a layer of confluent 2D organoid was formed in the upper container. Subsequently, the medium in the upper container was replaced in the nitrogen chamber. Two sets of similar culture containers for culturing epithelial cells were prepared. In one of the culture containers for culturing epithelial cells, the lid member was fitted to the opening portion of the upper container, and in the other, the lid member was not fitted to the opening portion of the upper container. Subsequently, these cells were incubated at 37° C. in an air environment. As a result, when the lid member was fitted to the opening portion of the upper container, the inside portion of the upper container was maintained in an anaerobic condition, and the inside portion of the lower container was maintained in an aerobic condition.

Subsequently, 3 days after the medium exchange, each epithelial cell was immunostained and observed with a fluorescence microscope. Specifically, in order to verify the apical polarity of epithelial cells, the cells of each group were stained with an antibody against ZO-1 protein, which is a marker for tight junctions, an antibody against CDH1 protein, which is a marker for adherence junctions, antibody against MUC2 protein, which is a marker for goblet cells, and an antibody against CHGA protein, which is a marker for neuroendocrine cells. In addition, F-actin was stained with phalloidin as a contrast.

FIGS. 7A and 7B are fluorescence micrographs showing the results of immunostaining. The scale bar is 50 μm. In FIG. 7A, the "aerobic condition" indicates a result of maintaining both the inside portion of the upper container and the inside portion of the lower container in an aerobic condition. In FIG. 7B, the "anaerobic/aerobic condition" indicates a result of maintaining the inside portion of the upper container in an anaerobic condition and maintaining the inside portion of the lower container in an aerobic condition.

As a result, it was clarified that even in a case where the lid member was fitted to the opening portion of the upper container and the apical membrane side of the epithelial cells was maintained in an anaerobic condition and the basement membrane side is maintained in an aerobic condition, tight junctions and adherence junctions were normally formed and the apical polarity was maintained as in the case where the lid member was not fitted to the opening portion of the upper container and culturing was conducted under aerobic conditions. It was also clarified that goblet cells and neuroendocrine cells, which are functional differentiated cells, can be differentiated from epithelial stem cells even when only the apical side of the epithelial cells is maintained under anaerobic conditions.

Experimental Example 5

(Co-Culture of Epithelial Cells and Anaerobic Bacteria 1) In the same manner as in Experimental Example 1, intestinal epithelial cells were cultured in the culture container for culturing epithelial cells shown in photographs of FIGS. 2A to 2C, and a confluent 2D organoid layer was formed on the surface of the upper container. Subsequently, 5 days after inoculating the upper container with the epithelial cells, the medium in the upper container was discarded, and *Bifidobacterium adolescentis* (*B. adolescentis*) suspended in the anaerobic cell culture medium was inoculated in the inside of the anaerobic chamber. *Bifidobacterium adolescentis* is an obligate anaerobic bacterium.

Two sets of culture containers for epithelial cell culture inoculated with *Bifidobacterium adolescentis* were prepared, and a lid member was fitted to the opening portion of one of the upper containers. Further, the lid member was not fitted to the opening portion of one of the upper containers and was left open. Subsequently, it was incubated at 37° C. in an air environment. As a result, in the former, the inside portion of the upper container was maintained in an anaerobic condition, and the inside portion of the lower container was maintained in an aerobic condition. Further, in the latter, both the inside portion of the upper container and the inside portion of the lower container were maintained in aerobic conditions.

FIGS. 8A and 8B are micrographs one day after inoculating with *Bifidobacterium adolescentis*. The scale bar is 50 μm. In FIG. 8A, the "anaerobic/aerobic" indicates a result of maintaining the inside portion of the upper container in an anaerobic condition and maintaining the inside portion of the lower container in an aerobic condition. Further, in FIG. 8B, the "aerobic/aerobic" indicates a result of maintaining both the inside portion of the upper container and the inside portion of the lower container in an aerobic condition.

As a result, as shown in FIG. 8A, in a case of maintaining the inside portion of the upper container in an anaerobic condition and maintaining the inside portion of the lower container in an aerobic condition, the growth of *Bifidobacterium adolescentis* together with epithelial cells was observed. In FIG. 8A, the colonies of *Bifidobacterium adolescentis* are indicated by arrows.

On the other hand, as shown in FIG. 8B, when both the inside portion of the upper container and the inside portion of the lower container were maintained under aerobic conditions, no growth of *Bifidobacterium adolescentis* was observed.

From the result, it was clarified that when maintaining the apical membrane side of the epithelial cells in an anaerobic condition, the maintaining the basement membrane side in an aerobic condition, and inoculating the apical membrane side of the epithelial cells with anaerobic bacteria, the epithelial cells and the anaerobic bacteria can be co-cultured.

Experimental Example 6

(Co-Culture of Epithelial Cells and Anaerobic Bacteria 2)

Anaerobic bacteria other than *Bifidobacterium adolescentis* were co-cultured with epithelial cells in the same manner as in Experimental Example 5. As the anaerobic bacteria, *Bacteroides fragilis* (*B. fragilis*), *Clostridium butyricum* (*C. butyricum*), and *Akkermansia muciniphila* (*A. muciniphila*) were used. The inside portion of the upper container was maintained under anaerobic conditions, and the inside portion of the lower container was maintained under aerobic conditions for culturing.

Figure 9:
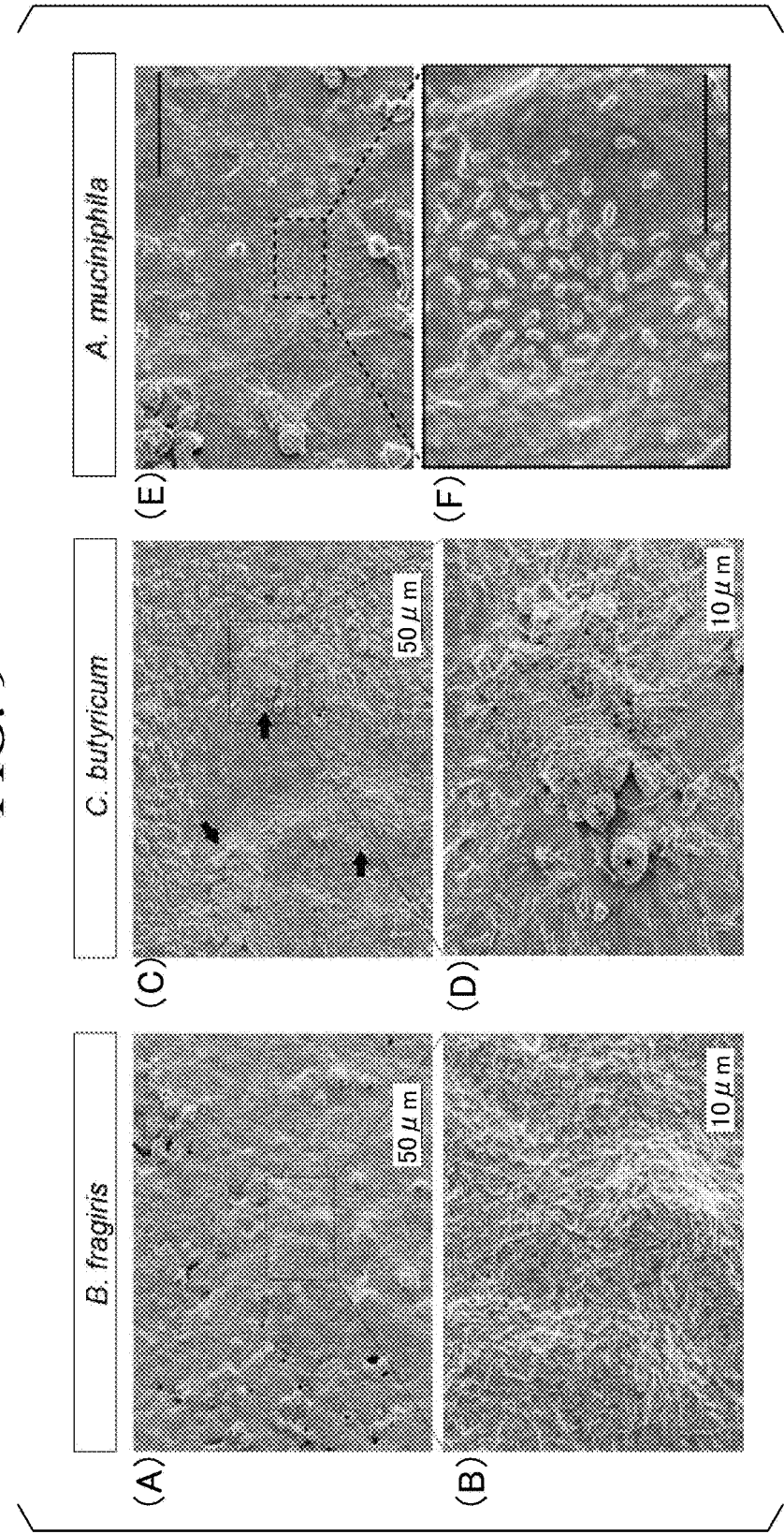
FIG. 9 is micrographs showing results of co-culturing epithelial cells and anaerobic bacteria in Experimental Example 6.

FIG. 9 is micrographs taken one day after inoculating with each anaerobic bacterium. Picture A in the figure shows the results of *Bacteroides fragilis*. The scale bar is 50 μm.

Picture B in the figure is an enlarged micrograph of the area surrounded by the dotted square in the picture A. The scale bar is 10 μm.

In addition, picture C in the figure is the result of *Clostridium butyricum*. The scale bar is 50 μm. In addition, colonies of *Clostridium butyricum* are indicated by arrows. Picture D in the figure is an enlarged micrograph of the area surrounded by the dotted square in the picture C. The scale bar is 10 μm.

In addition, picture E in the figure is the result of *Akkermansia muciniphila*. The scale bar is 20 μm. Picture F in the figure is an enlarged micrograph of the area surrounded by the dotted square in the picture E. The scale bar is 10 μm.

From the results, it was clarified that when maintaining the apical membrane side of epithelial cells in an anaerobic condition, maintaining the basement membrane side in an aerobic condition, and inoculating the apical membrane side of epithelial cells with the anaerobic bacteria, *Bacteroides fragilis, Clostridium butyricum*, and *Akkermansia muciniphila* can be co-cultured with the epithelial cells. The result indicates that various anaerobic bacteria can be cultured by the method of the present experimental example.

In particular, *Akkermansia muciniphila* is a microorganism that requires mucin produced from mature epithelial cells for growth and is essential for anaerobic activity, and is a microorganism that could not be cultured in vitro in the prior art. It has been clarified that the method of the present invention can also culture intestinal bacteria such as *Akkermansia muciniphila*, which could not be cultured in vitro.

Experimental Example 7

(Co-Culture of Epithelial Cells and Anaerobic Bacteria 3)

Almost no goblet cells are observed in undifferentiated epithelial cells, and no mucin production is observed from goblet cells. Mucin is essential for the growth of *Akkermansia muciniphila*, and anaerobic conditions are also essential.

In the present experimental example, *Akkermansia muciniphila* was co-cultured on 2D organoids of mature epithelial cells in the same manner as in Experimental Example 5, and the growth of the fungus was examined. 2D organoids of mature epithelial cells were cultured in MHCO medium. Also, for comparison, *Akkermansia muciniphila* was co-cultured on 2D organoids of undifferentiated epithelial cells.

2D organoids of undifferentiated epithelial cells were prepared as 2D organoids after forming 3D organoids of epithelial cells under conditions that inhibit systematic differentiation using an undifferentiated culture medium supplemented with a p38 inhibitor and nicotineamide.

The undifferentiated culture medium was prepared by adding SB202190 (Sigma-Aldrich) having a final concentration of 3 μM and nicotinamide (Sigma-Aldrich) having a final concentration of 10 mM to the MHCO culture medium.

Figure 10:
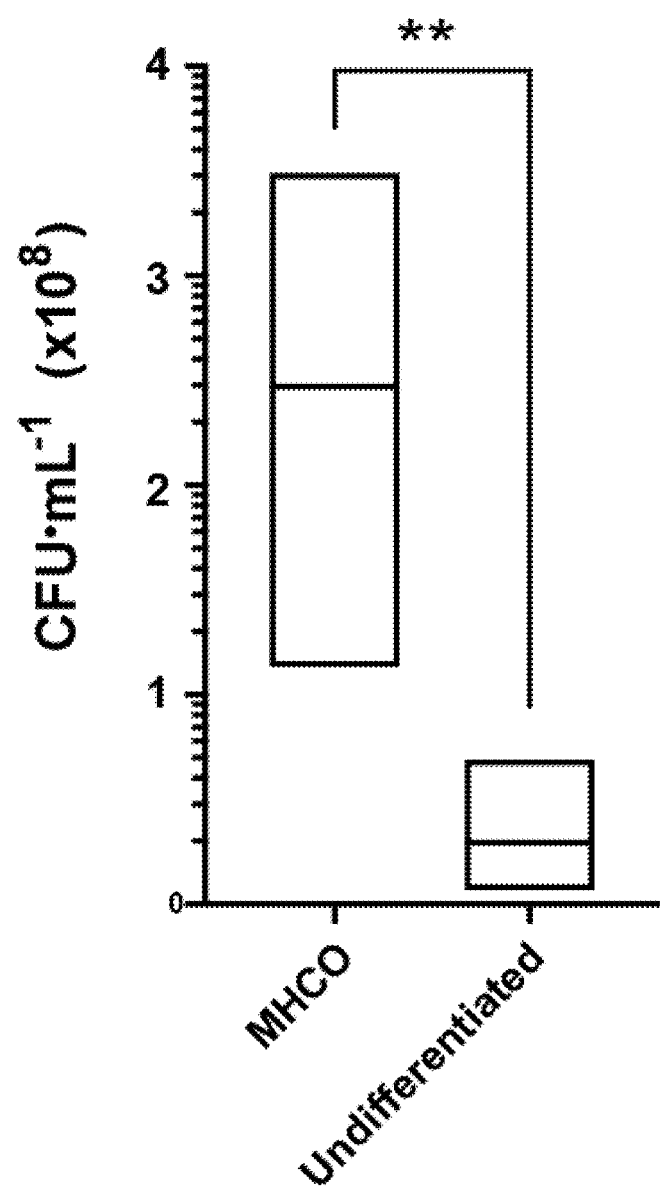
FIG. 10 is a graph showing results of quantifying growth of *Akkermansia muciniphila* (*A. muciniphila*) co-cultured on undifferentiated epithelial cells and mature epithelial cells in Example 7.

FIG. 10 is a graph showing the results of quantifying the cultured *Akkermansia muciniphila*. In FIG. 10, the "MHCO" indicates a result of quantifying *Akkermansia muciniphila* co-cultured on mature epithelial cells cultured using MHCO medium, and the "Undifferentiated" indicates a result of quantifying *Akkermansia muciniphila* co-cultured on undifferentiated epithelial cells cultured using an undifferentiated culture medium. Further, "**" indicates that there is a significant difference at p<0.01.

As a result, it was clarified that the growth of *Akkermansia muciniphila* was hardly observed on the undifferentiated epithelial cells. In contrast, *Akkermansia muciniphila* growth was observed on mature epithelial cells. The result further supports the ability to produce 2D organoids consisting of mature epithelial cells and co-culture anaerobic microorganisms by the method of the present invention.

INDUSTRIAL APPLICABILITY

According to the present invention, it is possible to provide a technique for culturing epithelial cells in a plane, easily controlling the oxygen partial pressure on an apical membrane side and a basement membrane side, and culturing the cells in an environment closer to an internal side of a living body.

REFERENCE SIGNS LIST

100: Culture container for culturing epithelial cells
110: Upper container
111: Opening portion
120: Lid member
130: Cell culture medium
140: Lower container
112: Area
113: Membrane
130, 131: Medium
150: Epithelial cell
151: Apical membrane side
152: Basement membrane side

What is claimed is:

1. A culture container for culturing epithelial cells, comprising:
   an upper container;
   a lid member configured to fit in an airtight manner to an opening portion of the upper container; and
   a lower container configured to accommodate the upper container and a cell culture medium
   wherein at least a part of an area of the upper container in contact with the cell culture medium is formed of a membrane that is permeable to at least a part of the components of the cell culture medium and impermeable to a cell, and
   wherein a material of the lid member has an oxygen permeability coefficient of $1.0 \times 10^{-6}$ cm$^3$ cm/(cm$^2$·sec·atm) or less at a pressure of 1 atm and a temperature of 25° C.

2. The culture container for culturing epithelial cells according to claim 1, wherein the lid member or the upper container further comprises an oxygen scavenger portion configured to hold an oxygen scavenger.

3. A method for culturing epithelial cells, comprising:
   coating a surface of an upper container of a culture container for culturing epithelial cells with an extracellular matrix;
   accommodating a cell culture medium and the upper container in a lower container;
   inoculating the extracellular matrix with an epithelial cell;
   incubating the culture container for culturing epithelial cells under a culture condition to form a layer of a 2D organoid on the extracellular matrix by the epithelial cell;
   fitting a lid member in an airtight manner to an opening portion of the upper container; and
   further incubating the culture container for culturing epithelial cells under the culture condition;
   wherein the culture container comprises:
   an upper container;
   a lid member configured to fit in an airtight manner to an opening portion of the upper container; and a lower container configured to accommodate the upper container and a cell culture medium, wherein at least a part of an area of the upper container in contact with the cell culture medium is formed of a membrane that is permeable to at least a part of the components of the cell culture medium and impermeable to a cell, and a material of the lid member has an oxygen permeability coefficient of $1.0 \times 10^{-6}$ cm$^3$ cm/(cm$^2$·sec·atm) or less at a pressure of 1 atm at a temperature of 25° C.

4. The culture method according to claim 3, wherein the epithelial cell is a cell in which a 3D organoid of three-dimensionally cultured epithelial cells is dispersed in a single cell suspension.

5. The culture method according to claim 3, wherein the cell culture medium comprises at least one selected from the group consisting of insulin-like growth factor 1 (IGF1), fibroblast growth factor 2 (FGF2), and EGF-like growth factor, and at least one selected from the group consisting of a Wnt agonist, a bone morphogenetic factor (BMP) inhibitor, and a transforming growth factor-β (TGF-β) inhibitor.

6. The culture method according to claim 5, wherein the EGF-like growth factor contains epiregulin (EREG).

7. The culture method according to claim 5, wherein the EGF-like growth factor comprises epidermal growth factor (EGF).

8. The culture method according to claim 5, wherein the Wnt agonist comprises a complex of Wnt protein and afamin.

9. The culture method according to claim 3, wherein fitting the lid member in an airtight manner to an opening portion of the upper container is carried out in a low oxygen atmosphere.

10. The culture method according to claim 3, further comprising:
inoculating the upper container, in which the layer of the 2D organoid is formed, with an anaerobic bacterium, after incubating the culture container before the fitting a lid member in an airtight manner to an opening portion of the upper container.

11. A co-culture producing method comprising:
coating a surface of an upper container of a culture container for culturing epithelial cells with an extracellular matrix;
accommodating a cell culture medium and the upper container in a lower container;
inoculating the extracellular matrix with an epithelial cell;
incubating the culture container for culturing epithelial cells under a culture condition to form a layer of a 2D organoid on the extracellular matrix by the epithelial cell;
fitting a lid member in an airtight manner to an opening portion of the upper container;
further incubating the culture container for culturing epithelial cells under the culture condition; and
inoculating the upper container, in which the layer of the 2D organoid is formed, with an anaerobic bacterium, after the incubating the culture container and before the fitting the lid member in an airtight manner;
wherein the culture container comprises:
an upper container;
a lid member configured to fit in an airtight manner to an opening portion of the upper container; and
a lower container configured to accommodate the upper container and a cell culture medium,
wherein at least a part of an area of the upper container in contact with the cell culture medium is formed of a membrane that is permeable to at least a part of the components of the cell culture medium and impermeable to a cell, and
a material of the lid member has an oxygen permeability coefficient of $1.0 \times 10^{-6}$ cm$^3$ cm/(cm$^2$·sec·atm) or less at a pressure of 1 atm at a temperature of 25° C.

* * * * *